US 10,576,882 B2

(12) United States Patent
Birman et al.

(10) Patent No.: US 10,576,882 B2
(45) Date of Patent: Mar. 3, 2020

(54) LIGHT GUIDE WITH CHAPLET TICK MARKS

(71) Applicant: Continental Automotive Systems, Inc., Auburn Hills, MI (US)

(72) Inventors: Vyacheslav Birman, Auburn Hills, MI (US); Curt Ollila, Fenton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/112,950

(22) Filed: Aug. 27, 2018

(65) Prior Publication Data

US 2018/0361920 A1 Dec. 20, 2018

Related U.S. Application Data

(63) Continuation of application No. PCT/US2017/019536, filed on Feb. 24, 2017.

(60) Provisional application No. 62/300,627, filed on Feb. 26, 2016.

(51) Int. Cl.
| | |
|---|---|
| *B60K 37/02* | (2006.01) |
| *B60Q 3/12* | (2017.01) |
| *F21V 8/00* | (2006.01) |
| *B60Q 3/14* | (2017.01) |
| *B60Q 3/64* | (2017.01) |

(52) U.S. Cl.
CPC ............ *B60Q 3/12* (2017.02); *B60K 37/02* (2013.01); *B60Q 3/14* (2017.02); *B60Q 3/64* (2017.02); *G02B 6/0036* (2013.01); *G02B 6/0068* (2013.01); *B60K 2370/33* (2019.05); *B60K 2370/331* (2019.05); *B60K 2370/336* (2019.05); *B60K 2370/341* (2019.05); *B60K 2370/695* (2019.05)

(58) Field of Classification Search
CPC .................................. B60Q 3/12; G01D 11/28
See application file for complete search history.

(56) References Cited

U.S. PATENT DOCUMENTS

| | | | |
|---|---|---|---|
| 7,494,256 B1 | 2/2009 | Kelman et al. | |
| 8,138,901 B2 | 3/2012 | Bowden et al. | |
| 8,840,260 B2 * | 9/2014 | Nirei ...................... | G01D 11/28 362/23.07 |
| 2004/0228104 A1 | 11/2004 | Birman | |
| 2009/0121853 A1 | 5/2009 | Eich et al. | |

(Continued)

OTHER PUBLICATIONS

International Search Report and Written Opinion dated May 10, 2017 from corresponding International Patent Application No. PCT/US2017/019536.

*Primary Examiner* — Alexander K Garlen
*Assistant Examiner* — Eric T Eide

(57) ABSTRACT

A gauge assembly includes a gauge surface including at least one graphic, which may be a plurality of graphics defining a scale in a generally circular pattern on the gauge surface. The gauge surface has a viewable side. A light guide has a main body portion disposed adjacent to the gauge surface and corresponding to the shape of the gauge surface. The light guide has a plurality of raised tick marks extending from the main body portion. Each tick mark is viewable via a viewing side of the gauge surface. The light guide includes ends that curve away from the gauge surface to receive light. The light guide is configured to provide illumination to the illuminable graphic(s) and the plurality of tick marks.

18 Claims, 4 Drawing Sheets

(56) References Cited

U.S. PATENT DOCUMENTS

| | | | |
|---|---|---|---|
| 2010/0188835 A1* | 7/2010 | Kato | G01D 11/28 362/23.2 |
| 2011/0051393 A1* | 3/2011 | Ishikawa | G01D 11/28 362/23.19 |
| 2013/0027902 A1* | 1/2013 | Miyazawa | G01D 11/28 362/23.14 |
| 2015/0151668 A1* | 6/2015 | Birman | G01D 11/28 362/23.21 |
| 2016/0091346 A1* | 3/2016 | Otani | G01D 11/28 362/23.16 |
| 2016/0229337 A1* | 8/2016 | Birman | G02B 6/001 |

* cited by examiner

LIGHT GUIDE WITH CHAPLET TICK MARKS

FIELD

The present disclosure relates to vehicle instrument panels and clusters, and more specifically to a vehicle instrument panel that includes a light guide for illuminating a gauge surface.

BACKGROUND

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include instrument panels to communicate information indicative of operation to an operator. Motor vehicles include instrument panels with several gauges and dials that communicate vehicle conditions such as speed, engine rpm, temperature, and oil pressure along with many other operational parameters. A gauge surface can be illuminated to provide a desired aesthetic appearance. Planar light guides and/or LEDs are typically utilized for propagating light to desired locations, however, light is not always evenly distributed.

One set of LEDs, including perhaps 2-4 LEDs may be used to illuminate graphics contained on an appliqué. Another set of LEDs, such as 4-6 LEDs may be distributed in a circular pattern about the appliqué in order to illuminate a set of tick marks disposed in a circular pattern the appliqué.

There is a desire, however, for fewer components in instrument cluster lighting assemblies, but without decreasing the aesthetics and even distribution of light about the appliqué.

SUMMARY

A light guide is provided that may provide light to a gauge surface, of, for example, and automotive instrument cluster. The light guide provides light to illuminate graphics on the gauge surface, as well as to light up tick marks.

In one form, which may be combined with or separate from the other forms provided herein, a gauge assembly is provided that has a gauge surface having at least one illuminable graphic defined thereon. The gauge surface defines a plurality of openings therethrough. A light guide has a main body portion disposed adjacent to the gauge surface. The light guide has a plurality of raised tick marks extending from the main body portion. Each tick mark extends through an opening of the plurality of openings defined by the gauge surface. The light guide includes ends that curve away from the gauge surface to receive light. The light guide is configured to provide illumination to the one or more illuminable graphics and the plurality of tick marks.

In another form, which may be combined with or separate from the other forms described herein, a gauge assembly includes a gauge surface including a plurality of illuminable graphics defining a scale in a generally circular pattern on the gauge surface. The gauge surface has a viewable side. A light guide has a main body portion disposed adjacent to the gauge surface and corresponding to the shape of the gauge surface. The light guide has a plurality of raised tick marks extending from the main body portion. Each tick mark is viewable via the viewing side of the gauge surface. The light guide includes ends that curve away from the gauge surface to receive light. The light guide is configured to provide illumination to the plurality of illuminable graphics and the plurality of tick marks.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DRAWINGS

Examples are reflected in the drawings, which will be described below. The drawings described herein are for illustration purposes only and are not intended to limit the scope of the present disclosure in any way.

DESCRIPTION

The following description is merely exemplary in nature and is not intended to limit the present disclosure, application, or uses.

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ".

Examples of the invention are described below. It should be noted that these and other examples or embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art. Other embodiments may be utilized, and other changes may be made, without departing from the spirit or scope of the subject matter presented here.

Figure 1:
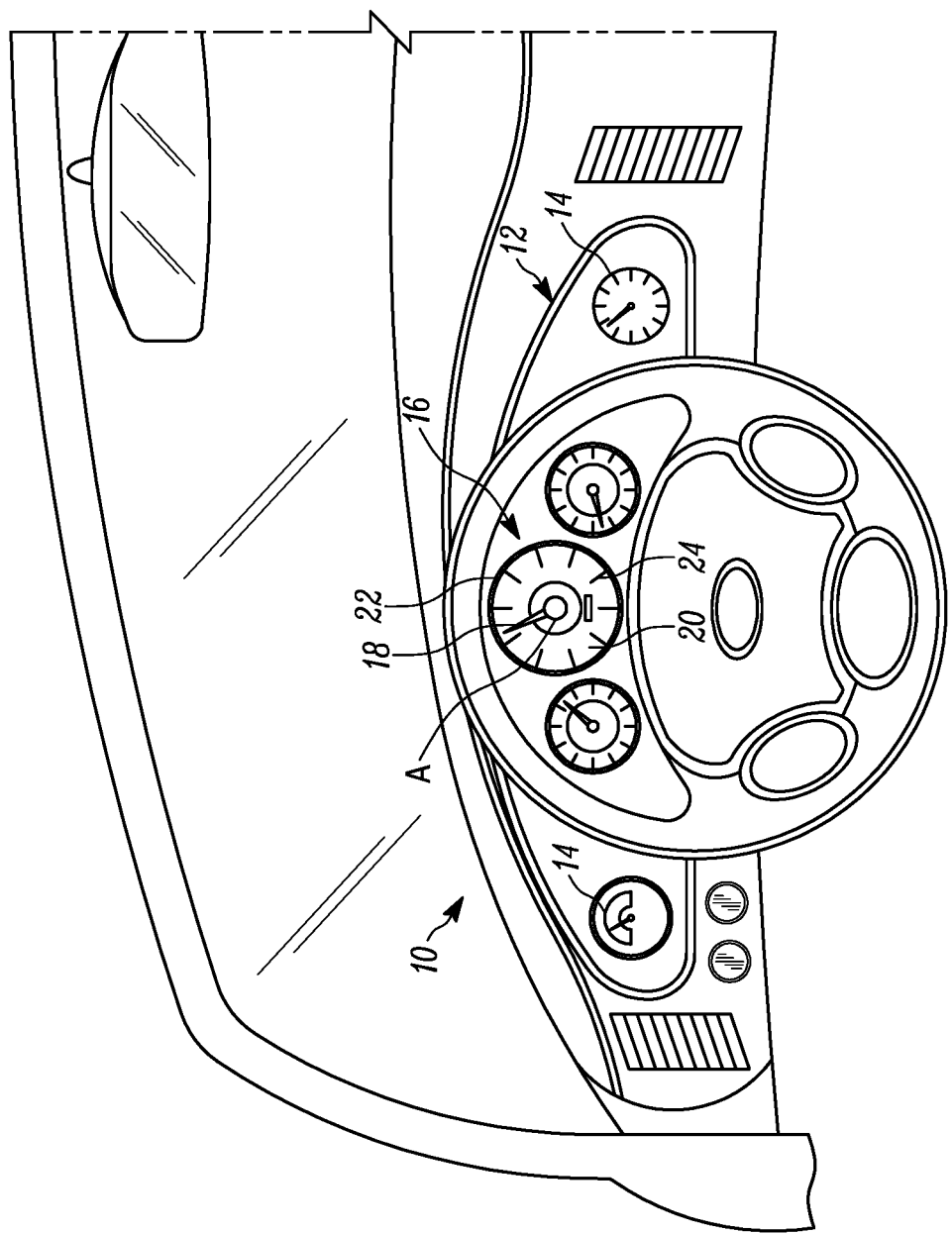
FIG. 1 is a schematic view of an example vehicle dashboard and instrument panel including a gauge assembly, according to the principles of the present disclosure.
Figure 2:
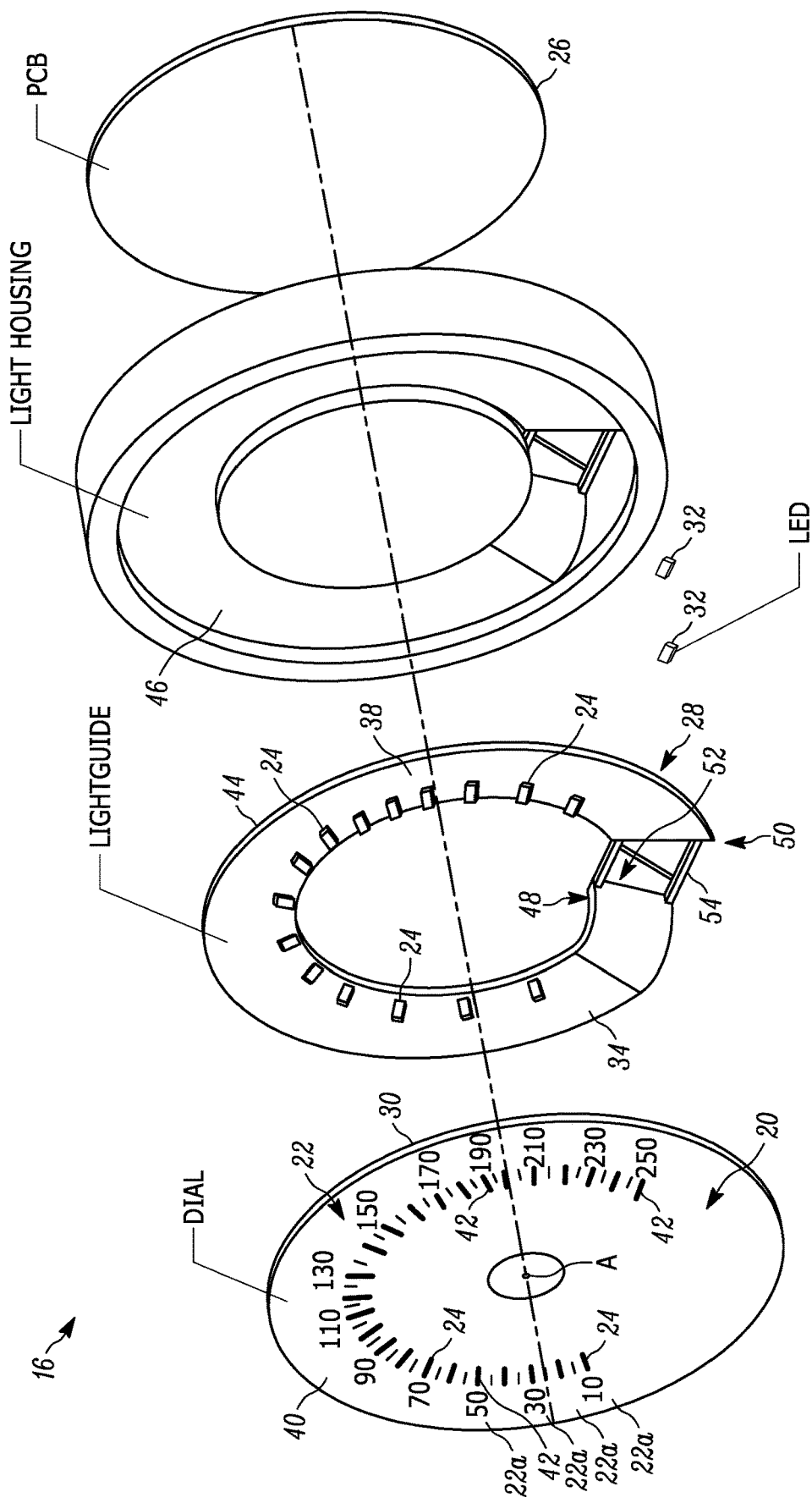
FIG. 2 is an exploded view of the gauge assembly shown in FIG. 1, in accordance with the principles of the present disclosure.
Figure 3:
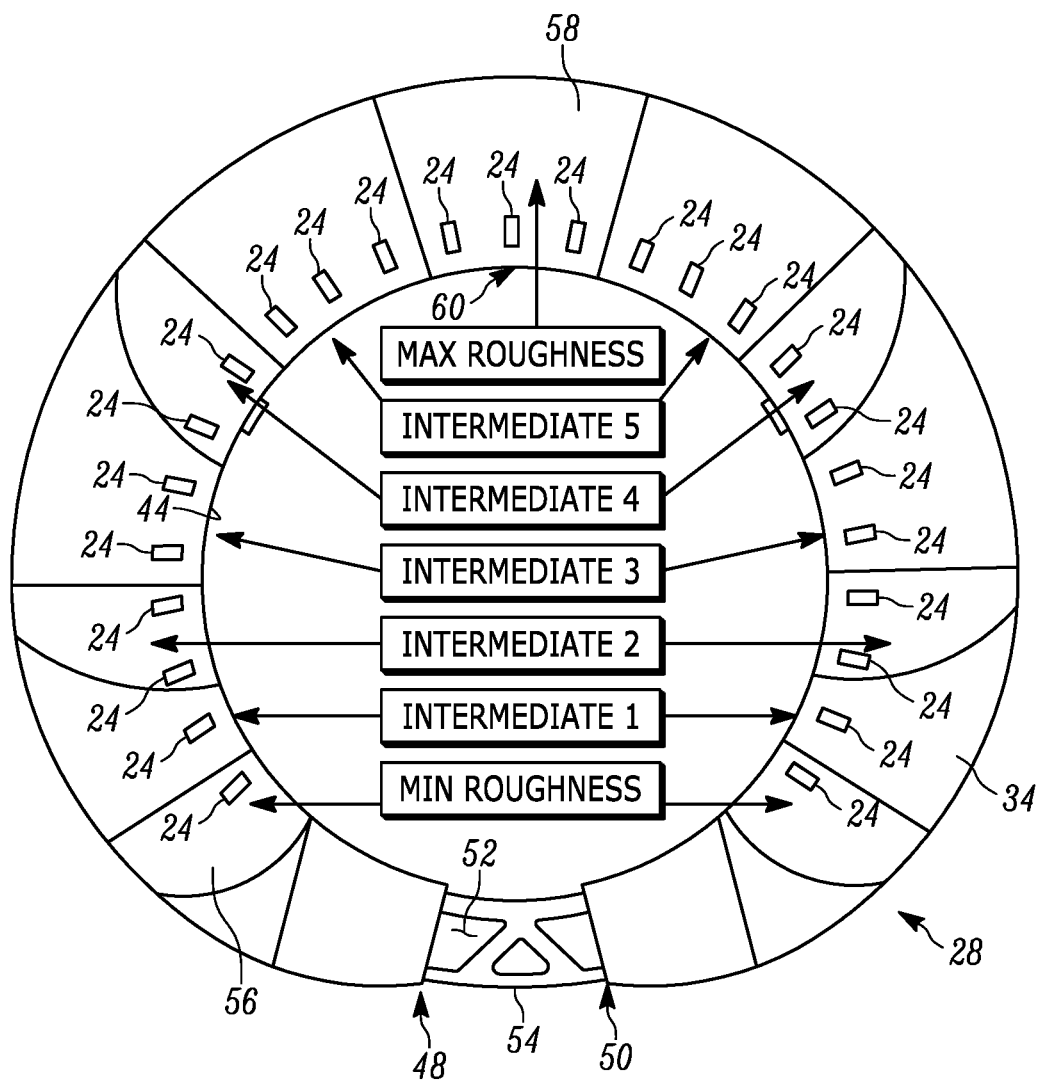
FIG. 3 is a plan view of an example light guide of the gauge assembly of FIGS. 1-2, according to the principles of the present disclosure.
Figure 4:
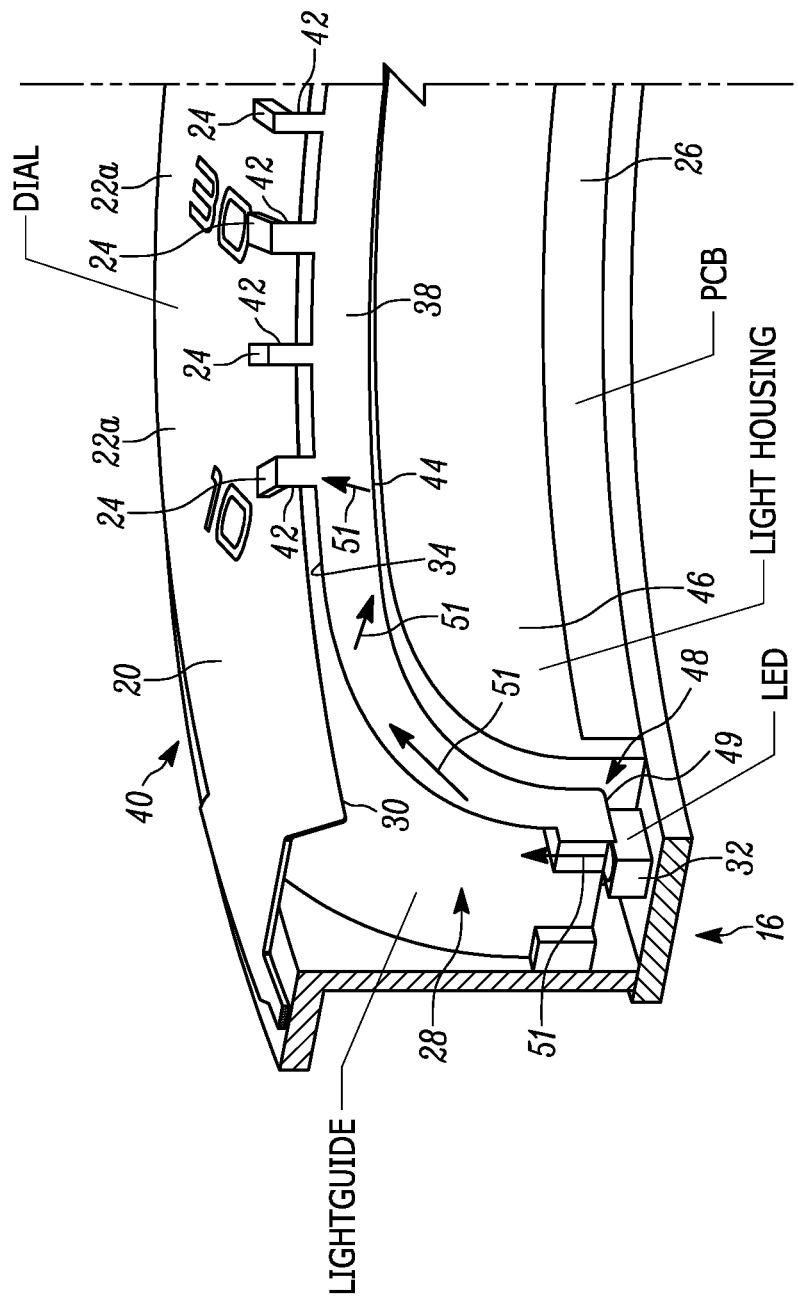
FIG. 4 is a cross-sectional view of a portion of the gauge assembly of FIGS. 1-3, in accordance with the principles of the present disclosure.

Referring to FIG. 1, a vehicle dashboard 10 is shown and includes an instrument panel 12 that includes a main gauge assembly 16 and accessory gauges 14. With reference now to FIGS. 1-2, the main gauge assembly 16 includes a gauge surface 20 with a scale 22 or other graphics that are illuminable. Illuminable tick marks 24 may also be included adjacent to the scale 22 or other graphics.

The gauge assembly 16 may include a pointer 18 (only shown in FIG. 1) that rotates about a central axis A to indicate a specific value on the scale 22. In this example, the gauge assembly 16 is a speedometer or tachometer; however, other gauges are also within the contemplation of this disclosure. The pointer 18 may be supported on a shaft (not shown) driven by a stepper motor (amounted) mounted to a printed circuit board 26. A light source (not shown) may be disposed along or adjacent to the central axis for illuminating the pointer 18.

The gauge surface 20 may be an appliqué, as known in the art. The scale 22 (which includes graphic numerals 22*a*) is disposed in a circular pattern about the central axis A, in this example. The scale 22 may be formed on the gauge surface 20. The graphic numerals 22*a* or other graphics may be formed as openings or transparent or translucent portions of the gauge 20, by way of example.

Referring now to FIGS. 1-4, the scale 22 (including the graphic numerals 22*a*) are illuminated by a light guide 28, which is disposed about the central axis A adjacent to a rear side 30 of the gauge surface 20. The light guide 28 receives light from one or more light sources 32 mounted to the printed circuit board 26. For example, two light sources 32 or any plurality of light sources 32, such as four light sources 32, may be used to illuminate the light guide 28. The light sources 32 are light emitting diode (LED) packages, however other known light sources are within the contemplation of this disclosure.

The light guide 28 may be planar, or as shown in this example, the light guide 28 as viewed from a forward side 34. Therefore, in this example, the light guide 28 is not disposed within a single plane 34. For example, both the light 28 and the gauge surface 20 may have corresponding curvatures. The geometric shape of the light guide 28 and the gauge surface 20 may be round and concave.

In addition to the graphics 22*a*, the gauge assembly 16 includes a plurality of tick marks 24. In this example, the light guide 28 has a main body portion 38 disposed adjacent to the rear side 30 of the gauge surface 20. The main body portion 38 may have a shape corresponding to the shape of the gauge surface 20. The plurality of raised tick marks 24 extend from the main body portion 38. The tick marks 24 may have a substantially rectangular shape, in some examples. The tick marks 24 may be unitarily formed with the main body portion 38, or otherwise attached to the main body portion 38. For example, both the main body portion 38 and the tick marks 24 may be unitarily formed as one piece by injection molding PMMA (acrylic). The light guide 28 may be translucent or transparent, by way of example.

The gauge surface 20 has a viewing side 40, which is the side of the gauge surface 20 that is viewable by a driver or passenger, by way of example. Both the scale 22 and the tick marks 24 are visible via the viewing side 40. Thus, the tick marks 24 are viewable by way of the viewing side 40, even though the light guide 28 is disposed "behind" the gauge surface 20, adjacent to the rear side 30 of the gauge surface 20. In order for the tick marks 24 to be visible on the viewing side 40, the tick marks 24 are viewable either through openings in the gauge surface 20 or through windows (translucent or transparent portions) of the gauge surface 20.

In the illustrated example, the gauge surface 20 defines a plurality of openings 42 (which may be cutouts), through which the raised tick marks 24 extend. Thus, each tick mark 24 of the plurality of tick marks 24 extends through an opening 42 of the plurality of openings 42. Therefore, the tick marks 24 are viewable from the viewing side 40 of the gauge surface 20.

The light guide 28 includes a first end 48 and a second end 50 that each curve away from the gauge surface 20 to receive light. The ends 48, 50 are disposed adjacent to each other and the ends 48, 50 define a gap 52 therebetween. A structural piece 54 may connect the first and second ends 48, 50 for stability.

The plurality of light sources 32 may be disposed on the printed circuit board 26, by way of example. The light sources 32 are configured to emit light into the light guide 28. For example, the light sources 32 are disposed adjacent to the ends 48, 50 of the light guide. A first light source 32 is configured to emit light into the first end 48, and a second light source 32 is configured to emit light into the second end 50. The ends 48, 50 curve toward the light sources 32, and each end 48, 50 defines a light receiving surface 49 exposed to and adjacent to the light sources 32. Light rays 51 propagate through the curved concave shape of the light guide 28 about the central axis A. The geometric shape of the light guide 28 propagates the light rays 51 around the light guide 28. For example, the light rays 51 are reflected through the light guide 28 off of the forward and rear surfaces 34, 44 to emit light toward the tick marks 24 and the graphics or scale 22.

The main body portion 38 of the light guide 28 has a forward surface 34 and a rear surface 44. The forward surface 34 is disposed directly adjacent to the rear surface 30 of the gauge surface 20. The rear surface 44 of the main body portion 38 is disposed adjacent to a light housing 46 and/or the printed circuit board 26. In this example, the main body portion 38 of the light guide 28 is sandwiched between the gauge surface 20 and the light housing 46, with the light housing 46 sandwiched between the main body portion 38 and the printed circuit board 26. The light sources 32 are sandwiched between the ends 48, 50 and the printed circuit board 26.

The main body portion 38 has surface roughness formed on the forward surface 34 and on the rear surface 44. Such surface roughness assists with the even distribution of light throughout the light guide 28. In some examples, the amount of surface roughness increases from minimum roughness areas 56 disposed near and adjacent to the ends 48, 50 to a maximum roughness area 58 disposed in a middle portion 60 of the light guide 28 that is farthest from the ends 48, 50.

The light guide 28 may have for example, first intermediate roughness areas 62 disposed next to the minimum roughness areas 56, the first intermediate roughness areas 62 in turn being disposed next to second intermediate roughness areas 64, the second intermediate roughness areas 64 in turn being disposed next to third intermediate roughness areas 66, the third intermediate roughness areas 66 in turn being disposed next to fourth intermediate roughness areas 68, the fourth intermediate roughness areas 68 in turn being disposed next to fifth intermediate roughness areas 70, the fifth intermediate roughness areas 70 in turn being disposed next to the maximum roughness area 58, by way of example; wherein the maximum roughness area is rougher than each other roughness area 56, 62, 64, 66, 68, 70, the fifth intermediate roughness area 70 is rougher than the fourth intermediate roughness area 68, the fourth intermediate roughness area 68 is rougher than the third intermediate roughness area 66, the third intermediate roughness area 66 is rougher than the second intermediate roughness area 64, the second intermediate roughness area 64 is rougher than the first intermediate roughness area 62, and the first intermediate roughness area 62 is rougher than the minimum roughness area 56.

Similarly, varying areas of roughness may be disposed on the rear surface 44 of the main body portion 38. The roughness on the forward surface 34 is divided by the roughness on the rear surface 44 allows for substantially even illumination of the graphics 22 and tick marks 24.

The light guide 28 may be curved to correspond with the gauge surface 20, but is not necessarily parallel to the gauge surface 20. Accordingly, the example light guide 28 uniformly illuminates a concave gauge scale 22 and surface 20 with light sources 32 mounted to a printed circuit board 26, while simultaneously illuminating the tick marks 36 that are formed as part of the light guide 28. The light guide 28 is configured to provide illumination to the scale 22 graphics 22a and the plurality of tick marks 36.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gauge assembly comprising:
a gauge surface having at least one illuminable graphic defined thereon, the gauge surface defining a plurality of openings therethrough; and
a light guide having a main body portion disposed adjacent to the gauge surface, the light guide having a plurality of raised tick marks extending from the main body portion, each tick mark of the plurality of tick marks extending through an opening of the plurality of openings, the light guide including a first end and a second end that each curve away from the gauge surface to receive light, the light guide being configured to provide illumination to the at least one illuminable graphic and the plurality of tick marks, the main body portion of the light guide having a forward surface and a rear surface with a surface roughness formed on the forward surface and on the rear surface and the surface roughness increases from a minimum surface roughness disposed near each of the first end and the second end toward a maximum surface roughness at a middle portion of the light guide.

2. The gauge assembly of claim 1, the plurality of tick marks being unitarily formed with the main body portion.

3. The gauge assembly of claim 2, the ends being disposed adjacent to each other defining a gap therebetween.

4. The gauge assembly of claim 3, the light guide being one of transparent and translucent.

5. The gauge assembly of claim 1, further comprising a printed circuit board and a plurality of light sources disposed on the printed circuit board, the light sources being configured to emit light into the light guide, the light sources being disposed adjacent to the ends of the light guide.

6. The gauge assembly of claim 5, the plurality of light sources comprising a first LED package configured to emit light into the first end and a second LED package configured to emit light into the second end of the light guide.

7. The gauge assembly of claim 6, each tick mark having a generally rectangular shape.

8. The gauge assembly of claim 7, the geometric shape of the light guide being round and concave.

9. A gauge assembly comprising:
a gauge surface including a plurality of illuminable graphics defining a scale in a generally circular pattern on the gauge surface, the gauge surface having a viewable side and a plurality of openings; and
a light guide having a main body portion disposed adjacent to the gauge surface and corresponding to the shape of the gauge surface, the light guide having a plurality of raised tick marks extending from the main body portion through the openings in the gauge surface, each tick mark of the plurality of tick marks being viewable via the viewing side of the gauge surface, the light guide including a first end and a second end that curve away from the gauge surface to receive light, the light guide being configured to provide illumination to the plurality of illuminable graphics and the plurality of tick marks, the main body portion of the light guide having a forward surface and a rear surface with a surface roughness formed on the forward surface and on the rear surface wherein the surface roughness increases from a minimum surface roughness disposed near each of the first end and the second end toward a maximum surface roughness at a middle portion of the light guide.

10. The gauge assembly of claim 9, the plurality of tick marks being unitarily formed with the main body portion.

11. The gauge assembly of claim 10, the ends being disposed adjacent to each other, the ends defining a gap therebetween.

12. The gauge assembly of claim 11, the light guide being one of transparent and translucent.

13. The gauge assembly of claim 9, further comprising a printed circuit board and a plurality of light sources disposed on the printed circuit board, the light sources being configured to emit light into the light guide.

14. The gauge assembly of claim 13, the plurality of light sources being disposed adjacent to the ends of the light guide.

15. The gauge assembly of claim 5, the plurality of light sources comprising a first LED package configured to emit light into the first end and a second LED package configured to emit light into the second end of the light guide.

16. The gauge assembly of claim 15, the gauge surface defining openings therethrough, the tick marks extending through the openings.

17. The gauge assembly of claim 16, each tick mark having a generally rectangular shape.

18. The gauge assembly of claim 17, each of the gauge surface and the main body portion of the light guide having a concave shape.

* * * * *